US012656794B2

(12) United States Patent  
Tokarski et al.

(10) Patent No.: US 12,656,794 B2  
(45) Date of Patent: Jun. 16, 2026

(54) SET FOR CONTACTLESS TEMPERATURE CONTROL, A METHOD OF GENERATING ELECTROMAGNETIC RADIATION WAVEFRONTS AND THE USE OF THE SET TO GENERATE PROFILES OF TEMPERATURE FIELDS

(71) Applicant: GENOMTEC S.A., Wroclaw (PL)

(72) Inventors: Miron Tokarski, Brzeg (PL); Malgorzata Malodobra-Mazur, Wroclaw (PL); Henryk Waldemar Roguszczak, Wroclaw (PL); Mateusz Czok, Strzelce Opolskie (PL)

(73) Assignee: Genomtec S.A., Wroklaw (PL)

( * ) Notice: Subject to any disclaimer, the term of this patent is extended or adjusted under 35 U.S.C. 154(b) by 1277 days.

(21) Appl. No.: 16/959,947

(22) PCT Filed: Dec. 19, 2018

(86) PCT No.: PCT/PL2018/050068
§ 371 (c)(1),
(2) Date: Jul. 2, 2020

(87) PCT Pub. No.: WO2019/135687
PCT Pub. Date: Jul. 11, 2019

(65) Prior Publication Data
US 2021/0072777 A1     Mar. 11, 2021

(30) Foreign Application Priority Data

Jan. 3, 2018    (PL) ........................................ 424096

(51) Int. Cl.
*G05D 23/27*         (2006.01)
*G01J 5/02*          (2022.01)
(Continued)

(52) U.S. Cl.
CPC ............ *G05D 23/27* (2013.01); *G01J 5/0205* (2013.01); *G01J 5/12* (2013.01); *G01J 5/485* (2022.01)

(58) Field of Classification Search
CPC .. G05D 23/27; G01J 5/205; G01J 5/12; G01J 5/485
See application file for complete search history.

(56) References Cited

U.S. PATENT DOCUMENTS

| | | | |
|---|---|---|---|
| 5,352,038 | A | 10/1994 | Schmidt et al. |
| 5,705,788 | A | 1/1998 | Beyer et al. |

(Continued)

FOREIGN PATENT DOCUMENTS

| | | |
|---|---|---|
| CN | 86105818 A | 6/1987 |
| CN | 1135732 A | 11/1996 |

(Continued)

OTHER PUBLICATIONS

Ales Dobesch, et al., "IR Thermometer with Automatic Emissivity Correction," Radioengineering, vol. 22, No. 4, pp. 1301-1306 (2013).

(Continued)

*Primary Examiner* — Steven W Crabb
*Assistant Examiner* — Keith Brian Assante
(74) *Attorney, Agent, or Firm* — Brooks Kushman P.C.

(57) ABSTRACT

A set for controlling the temperature, including a source of electromagnetic waves, like a laser or a diode, or an ultra-sound generator connected by wires to a specialized controller with a microprocessor connected by wires to a thermal radiation detector, like a pyroelectric detector or a thermocouple detector, the source of electromagnetic waves and the thermal radiation detector being placed at an angle between 0° and 180° with respect to each other, and a method for generating the profiles of radiation wavefronts (Continued)

Figure 1:
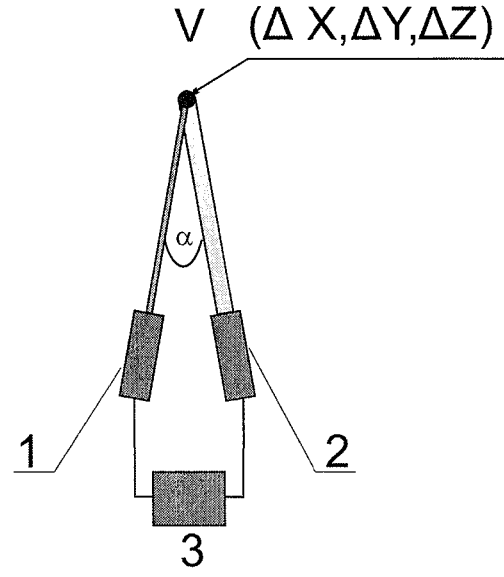

and the use of the set to generate the profiles of temperature fields using the profiles of wavefronts.

13 Claims, 21 Drawing Sheets

(51) Int. Cl.
| | | |
|---|---|---|
| *G01J 5/12* | (2006.01) | |
| *G01J 5/48* | (2022.01) | |

(56) References Cited

U.S. PATENT DOCUMENTS

| | | | |
|---|---|---|---|
| 2004/0060917 | A1 | 4/2004 | Liu et al. |
| 2005/0023478 | A1 | 2/2005 | Ruckman et al. |
| 2005/0106876 | A1 | 5/2005 | Taylor, II et al. |
| 2006/0018639 | A1* | 1/2006 | Ramamurthy .... H01L 21/67103 |
| | | | 392/416 |
| 2008/0121626 | A1 | 5/2008 | Thomas et al. |
| 2016/0238453 | A1* | 8/2016 | Tsuchiya ................... G01J 5/20 |

FOREIGN PATENT DOCUMENTS

| | | | |
|---|---|---|---|
| CN | 1292871 | A | 4/2001 |
| CN | 102301013 | A | 12/2011 |
| DE | 4316829 | A1 | 11/1994 |
| EP | 0798143 | A1 | 10/1997 |
| EP | 0836905 | A1 | 4/1998 |
| EP | 0961310 | A2 | 12/1999 |
| EP | 1043759 | A2 | 10/2000 |
| JP | S5814438 | A | 1/1983 |
| JP | H06300645 | A | 10/1994 |
| JP | H0933353 | A | 2/1997 |
| JP | H09313882 | A | 12/1997 |
| JP | H11238259 | A | 8/1999 |
| JP | 2001235373 | A | 8/2001 |
| JP | 2005231262 | A | 9/2005 |
| JP | 2007081062 | A | 3/2007 |
| JP | 2010048429 | A | 3/2010 |
| JP | 2011247980 | A | 12/2011 |
| JP | 2012238864 | A | 12/2012 |
| JP | 2016001642 | A | 1/2016 |
| JP | 2024014082 | A | 2/2024 |
| WO | 2008151469 | A | 12/2008 |
| WO | 2017/205528 | A1 | 11/2017 |
| WO | 2016117077 | A1 | 11/2017 |

OTHER PUBLICATIONS

ISR, PCT/PL2018/050068, Apr. 1, 2019.
Written Opinion, PCT/PL2018/050068, Apr. 1, 2019.
Seifert et al. Precise temperature calibration for laser heat treatment. AMA Conferences 2013—SENSOR 2013, OPTO 2013, IRS 2 2013, 2013, 302-307.
Laskin et al. Refractive beam shapers for focused laser beams. Proc. SPIE 9950, Laser Beam Shaping XVII, 995002, 2016, 1-12.
Polish Patent Office Search Report dated Jan. 30, 2019 for Application No. PL424096 (2 pages; with English machine translation).
European Patent Office Extended European Search Report mailed Sep. 24, 2021 for Application No. EP18898287.0 (9 pages).
Chinese Intellectual Property Office Search Report for Application No. CN201880084969.8 mailed Sep. 1, 2023 (2 pages; only English translation provided).
Japanese Patent Office Official Action for application JP2020-557112 dated May 20, 2025 (35 pages; with English machine translation).
Japanese Patent Office Official Action for application JP2024-014082 dated Apr. 28, 2025 (7 pages; with English machine translation).
Japanese Patent Office Official Action for application JP2020-557112 dated Jun. 4, 2024 (6 pages; with English machine translation).

* cited by examiner $V \quad (\Delta X, \Delta Y, \Delta Z)$

α

1    2

3 permanent profile in space
variable profile over time t0,t1,t2...tn - next moments in time tn t2 t1 t0

Radiant flux temperature in X

X 4    5    6

SET FOR CONTACTLESS TEMPERATURE CONTROL, A METHOD OF GENERATING ELECTROMAGNETIC RADIATION WAVEFRONTS AND THE USE OF THE SET TO GENERATE PROFILES OF TEMPERATURE FIELDS

The object of the invention is a set for contactless temperature control, a method of creating profiles of electromagnetic radiation wavefronts and the use of the set to generate, shape and control profiles of temperature fields, using profiles of wavefronts, planar and volumetric temperature fields on material surfaces and in material objects as a function of time. The invention is applicable in industrial, biological, chemical processes, in materials testing and in other industries requiring a temperature which is constant or variable over time and applied in a contactless manner.

In contemporary technological processes, like many research areas, the information about temperature at a given point or about the distribution of temperatures constitutes a very important element. Temperature measurement regimes are usually divided into contact-based and contactless. In contact-based measurements there is a need for a direct contact of the measuring medium with the given substance or point at which we want to know the temperature. In contactless methods, the subject of the measurement is the wavelength of the emitted infrared radiation, and then there is no contact of the measured medium with the measurement device. The measurement proceeds based on Planck's law and Wien's law. Planck's law describes the amount of energy radiated by an idealised black body. Wien's law on the other hand concerns a change in wavelength with respect to a change in temperature.

Regardless of the measurement regime, temperature measurement methods have been very well documented and developed in prior art. They differ primarily in the physical phenomenon used. In spite of this, new methods of its determination are still sought in terms of the construction of measurement systems. Its precision is a very important issue related to the determination of temperature. Currently used contactless methods are not characterised by high precision measurement at a given point. It is also necessary to move the studied object to enable the measurement of temperature. Moreover, the temperature sensor must be placed as close as possible to the measured object in order to collect the largest possible amount of emitted infrared radiation, to exceed the threshold value of a physical phenomenon enabling proper recording of the temperature.

Another important problem faced by practical applications is the change in the temperature of the object, meaning its heating. This is frequently impossible without using the direct proximity to a heat source or indeed contact of the object therewith. This may lead to the emergence of the problem of material compatibility between the heater and the sample. Another problem related to contact-based heating involves, e.g. in the case of biological samples (viruses, bacteria) the necessity to isolate the object from external environment. In contact-based heating methods, as well as the measurement of temperature, an important role is played by methods of delivering heat to an object (transferring it to a thermometric element). This may cause overheating or underheating of the object. As well as this, the heat lost through supply conduits leads to inaccuracy of the temperature measurement system, which requires additional isolation of the measurement environment and measurement devices.

In many cases, the act of measuring the physical quantity (temperature) and heating the object, regardless of it, is insufficient. This involves both technological and research processes. Hence, besides the measurement, it is still necessary to maintain a constant value of temperature within a precisely marked range, along with the possibility to locally level the differences in given temperature profiles, both discretely and on a two-dimensional surface. This is why systems of this type—temperature sensor-heater—are designed in a feedback loop. However, they do not offer the possibility to create and modify in a selective manner the profiles of temperature fields for the heated object.

In prior art, there are known methods enabling temperature measurement in a contactless manner and regulation of the distribution of temperatures. The object of the invention disclosed in document U.S. Pat. No. 77,442,714 (B1) is a device and method for remote surface temperature measurement. The device consists of: a radiation source, a table moving the substrate with respect to the radiation beam, a control unit and a temperature measuring unit. The table on which a substrate is placed, e.g. a silicon wafer, is subjected to treatment by means of a radiation beam. Temperature in the place subjected to treatment is measured remotely by means of an optical system. Temperature measurement proceeds by collecting infrared radiation emitted close to the place of treatment via an optical system. Subsequently, it is transferred by means of an optical fibre (or a bundle of optical fibres), upon polarisation, to a spectrophotometer which measures its wavelength. The temperature is determined based on this and on Planck's law. Analogue temperature signal is converted into digital signal, subsequently transferred to a controller which regulates the power of the beam treating the wafer.

In turn, the invention disclosed in document EP0836905B1 concerns a surface treatment method, controlled by temperature, by means of laser radiation generated by systems of diodes/lasers, distributed next to each other in the form of rows arranged one after another. Radiation is concentrated on the surface of the treated item whose temperature is monitored by means of a diode sensitive to infrared radiation, and the distribution of laser radiation intensity is adjusted to the required temperature profile. Adjusting the distribution of laser radiation intensity to the required temperature profile is obtained by controlling and/or activating and deactivating the individual rows of diodes or lasers in a feedback loop with a diode measuring the length of radiation emitted from the surface being treated.

Another patent document US006122440A discloses a device for fast thermal treatment of silicon wafers. The essence of the disclosed solution is a heating system based on a multi-zone source of thermal radiation in the shape of a disc. The source consists of concentrically arranged lamps on the envelope of two circles along with one positioned centrally. Each lamp is powered separately. The treated silicon material is illuminated by the whole surface of the source. The measurement of temperature proceeds by means of a sensor coupled with a controller of the lamps. The controller checks the amount of thermal energy delivered to the wafer surface, and if it indicates deviation from the given temperature, it can change the power of the lamp in the given zone (decrease or increase), therefore modifying the temperature profile on the wafer surface.

A technical problem faced by the present invention involves proposing such a temperature control method to enable delivering proper amount of heat energy in a remote manner at a given point, i.e. without direct contact of the object with a source of electromagnetic waves (heater) and a thermometric tool (detector), in order to provide a constant value of the flux of electromagnetic waves at this point. It should be also possible to regulate the amount of energy delivered from a system of several sources in a selective manner, in order to enable the shaping of the temperature on an irradiated surface or in the given volume. The heater and the sensor should be placed in a feedback loop in order to enable changing the amplitude of radiation incident locally onto an object. Surprisingly, the present invention solves the aforementioned technical needs.

The first object of the invention is a set for controlling temperature, characterised in that it comprises a source of electromagnetic waves, like a laser or a diode, or an ultra-sound generator connected by wires to a specialised controller with a microprocessor connected by wires to a thermal radiation detector, like a pyroelectric detector or a thermocouple detector, the source of electromagnetic waves and the thermal radiation detector being placed at an angle $\alpha$ between 0° and 180° with respect to each other. The source of electromagnetic waves, the detector and the controller are connected to each other by means of wires, in a feedback system which provides regulation and stabilisation of the power of sources, and consequently the temperature in the irradiated object.

The second object of the invention is a method for generating the profiles of electromagnetic radiation wave-fronts, characterised in that the shape of the wavefront profile is generated in accordance with the system of elec-tromagnetic radiation sources, by placing the sources of electromagnetic radiation in superposition with respect to each other or by changing the power delivered to the source of electromagnetic radiation, not exceeding the maximum power of the source, or by placing a lens or a system of lenses before the source or sources of electromagnetic waves. In the first embodiment of the invention, sources of electromagnetic waves with an equal value of the flux of electromagnetic waves emitted by them are placed in super-position with respect to each other. In such a position of the sources of electromagnetic waves, a planar wavefront of electromagnetic radiation is created. In another embodiment of the invention, sources of electromagnetic waves are placed in superposition, wherein at least one source of electromagnetic waves differs from the remaining sources of electromagnetic waves in the value of the flux of electro-magnetic waves emitted by them; a wavefront other than planar is created. The created wavefront can have a positive shape or a negative shape. In another embodiment of the invention, before a single source of electromagnetic waves there is a lens transmitting electromagnetic waves, which expands the flux of electromagnetic waves and the profile of a wavefront of electromagnetic radiation is created with the shape of the wall of the lens opposite with respect to the source of electromagnetic radiation waves.

The third object of the invention is the use of the set defined in the first object of the invention to generate profiles of temperature fields using the profiles of wavefronts gen-erated according to the method defined in the second object of the invention. The detector and the source of electromag-netic waves are placed and connected to each other as defined in the first object of the invention. The connection between the detector and the source of electromagnetic waves creates a feedback loop between them. The energy from sources of electromagnetic waves or a source of electromagnetic waves is delivered to a point in space (with coordinates of $\Delta x$, $\Delta y$, $\Delta z$) or a point on a plane (with coordinates of $\Delta x$, $\Delta y$, $\Delta z=0$) or a plane (with dimensions of $\Delta x$, $\Delta y$) in the form of a wavefront generated according to one of the methods defined in the second object of the invention. The energy delivered in the form of an electro-magnetic wave is absorbed by a point in space (with coordinates of $\Delta x$, $\Delta y$, $\Delta z$) or a point on a plane (with coordinates of $\Delta x$, $\Delta y$, $\Delta z=0$) or a plane (with dimensions of $\Delta x$, $\Delta y$). The absorption of electromagnetic waves causes an increase in the temperature. A change in the temperature is recorded by a detector. The software of the detector com-pares the value of temperature measured at a point in space (with coordinates of $\Delta x$, $\Delta y$, $\Delta z$) or at a point on a plane (with coordinates of $\Delta x$, $\Delta y$, $\Delta z=0$) or a plane (with dimensions of $\Delta x$, $\Delta y$) to the value of the given temperature. If temperature values differ, then a change in power delivered to the sources or source of electromagnetic waves is executed by a spe-cialised controller. This causes a change in the magnitude of the flux of the electromagnetic wave delivered to a point in space (with coordinates of $\Delta x$, $\Delta y$, $\Delta z$) or a point on a plane (with coordinates of $\Delta x$, $\Delta y$, $\Delta z=0$) or a plane (with dimen-sions of $\Delta x$, $\Delta y$). Another reading of temperature value is carried out by the detector. The temperature reading-power change sequence is repeated until the value of the measured temperature corresponds to the value of the given tempera-ture on the detector.

Connection of the detector to the source of electromag-netic waves enables selective regulation of the amplitude of radiation emitted by the source. Therefore, the amount of energy in the form of a flux of electromagnetic radiation delivered over time to the object remains constant, which means the constancy of temperature. Coupling of the detec-tor (1) with numerous independent sources of electromag-netic waves remaining in superposition allows independent regulation of the intensity of each of them, which results in shaping the profile of the wavefront and, as a consequence of this, the created profile of the temperature field.

The temperature control method according to the inven-tion can be used to control and regulate temperature in applications where it is difficult to make (install) a heat source and a temperature sensor in the controlled object due to very small volumes or very small surfaces of generating large temperature gradients on surfaces and volumes in materials with good thermal insulation. An advantage of the method according to the invention is the possibility of heating and measuring the temperature in closed environ-ments (e.g. bottles or sealed plastic culture tubes with microorganisms). Moreover, the method according to the invention may be applicable in many fields of science. For example, in biology, for PCR reactions and other processes requiring temperature which is constant or variable over time and controlled in a contact-free manner. This can be a useful tool for destroying tumour cells by precisely control-ling the temperature in specified areas of human body with a programmable profile. Another possible application of the method according to the invention involves controlling and initiating chemical reactions, studying the states of equilib-rium of chemical reactions etc. In physics—for material research, phase transitions, or as a contact-free furnace. Another advantage of the invention is the elimination of problems with cable entries, sockets, the impact of humidity and temperature on materials of the heater and temperature sensor.

The temperature control method according to the inven-tion may be used to measure the value of temperature within a range between several and several thousand degrees Cel-sius in any area in space (e.g. in a crucible placed in vacuum, sunk in a quartz tube) or on the surface of a table placed in an isolated environment.

Figure 2:
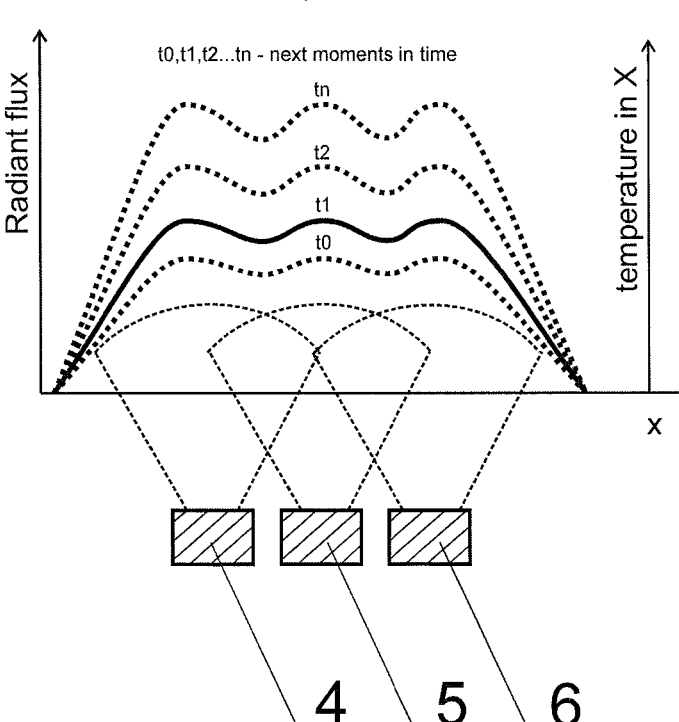
Figure 3A:
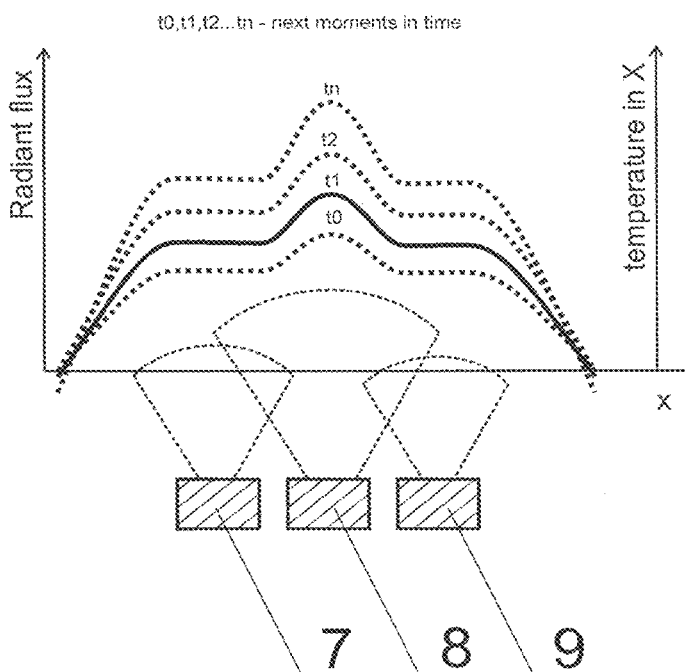
Figure 3B:
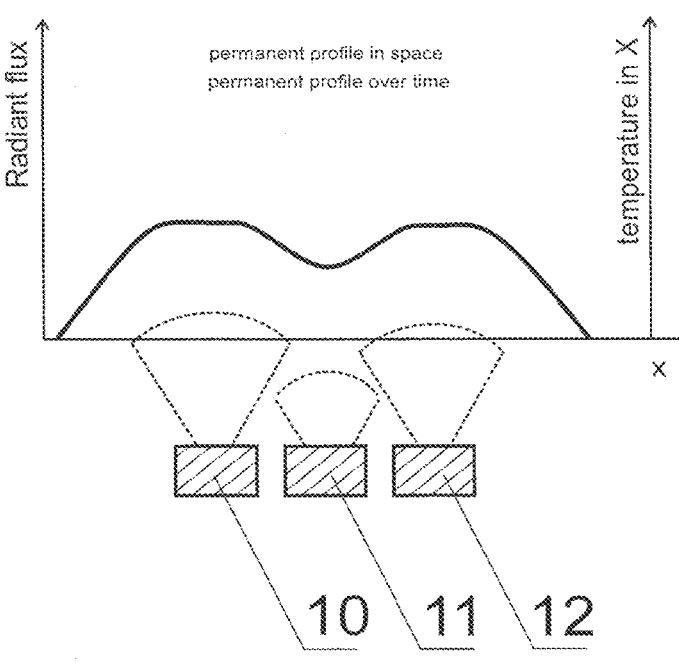
Figure 4:
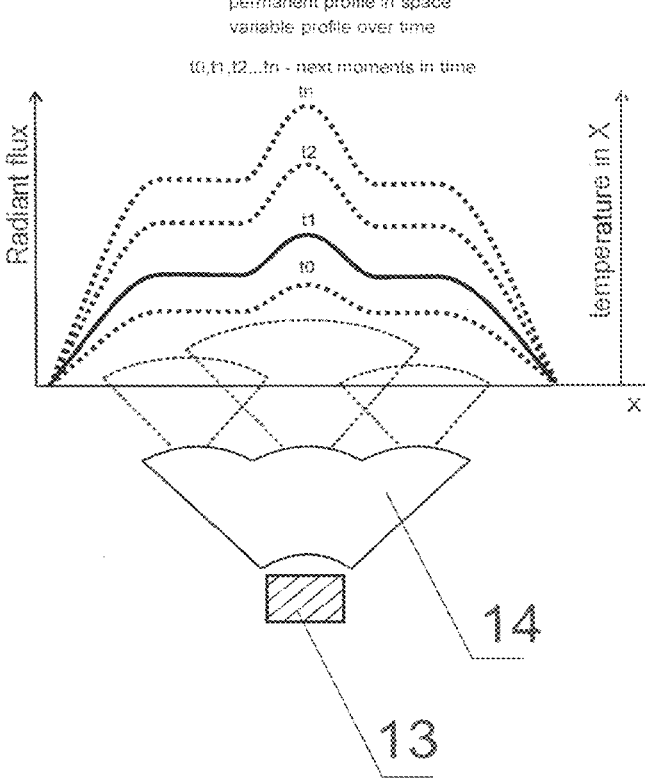
Figure 5:
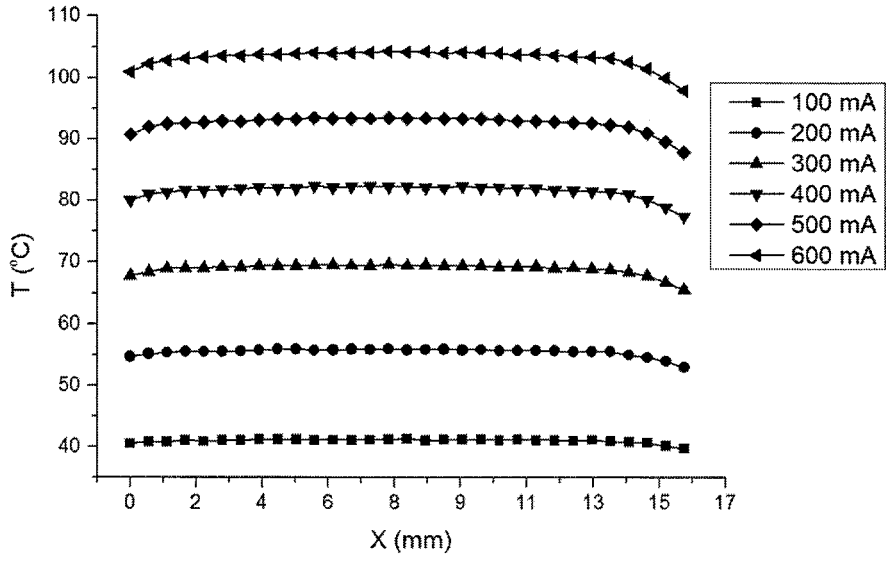
Figure 6:
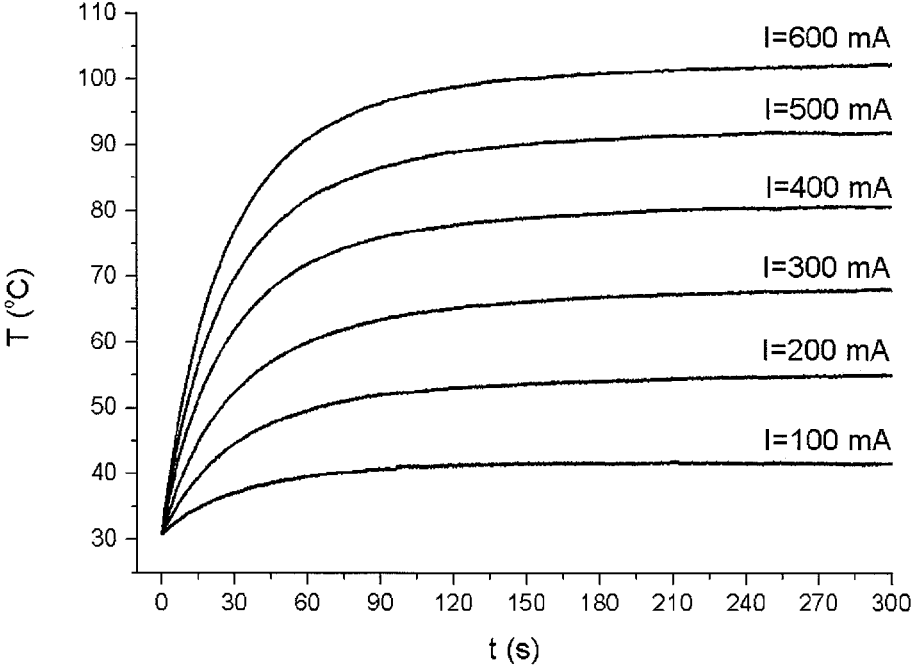
Figure 7:
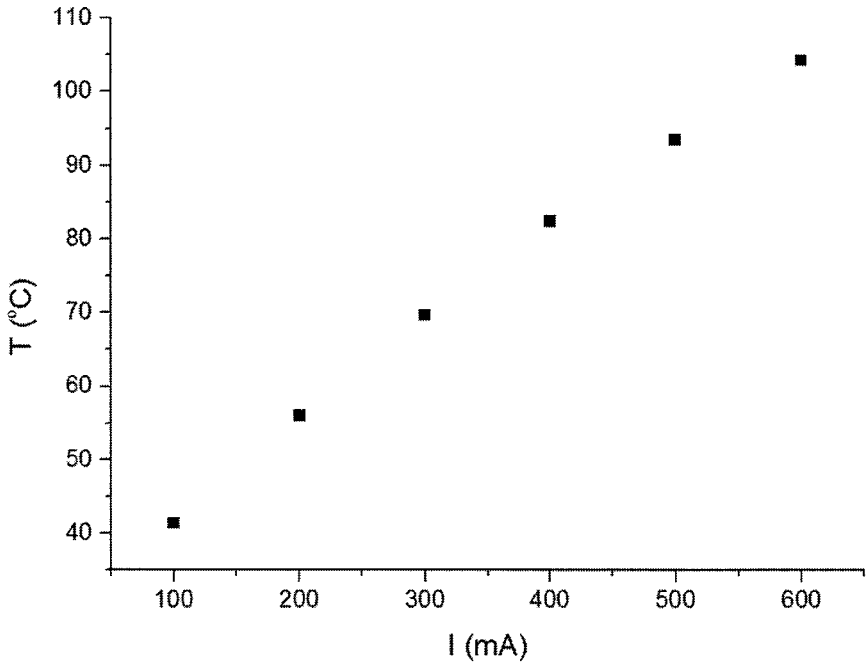
Figure 8A:
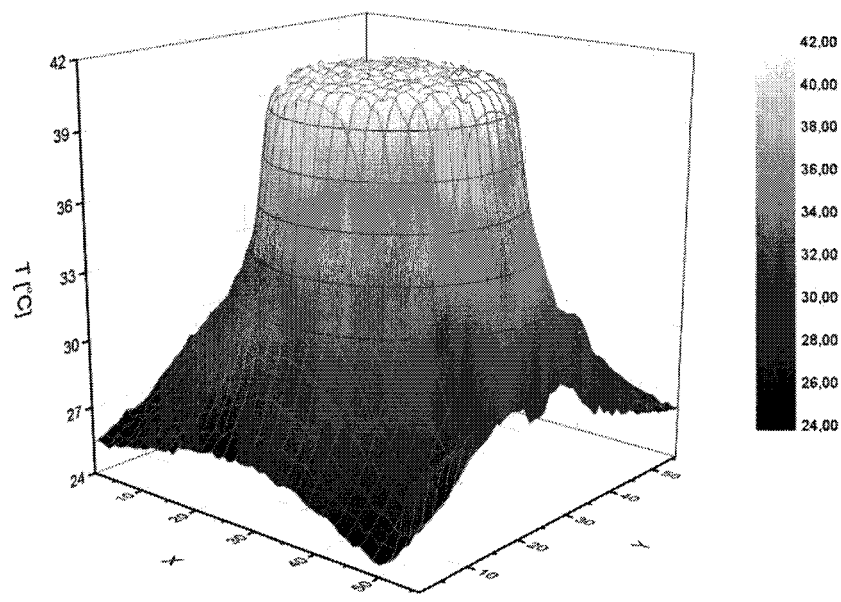
Figure 8B:
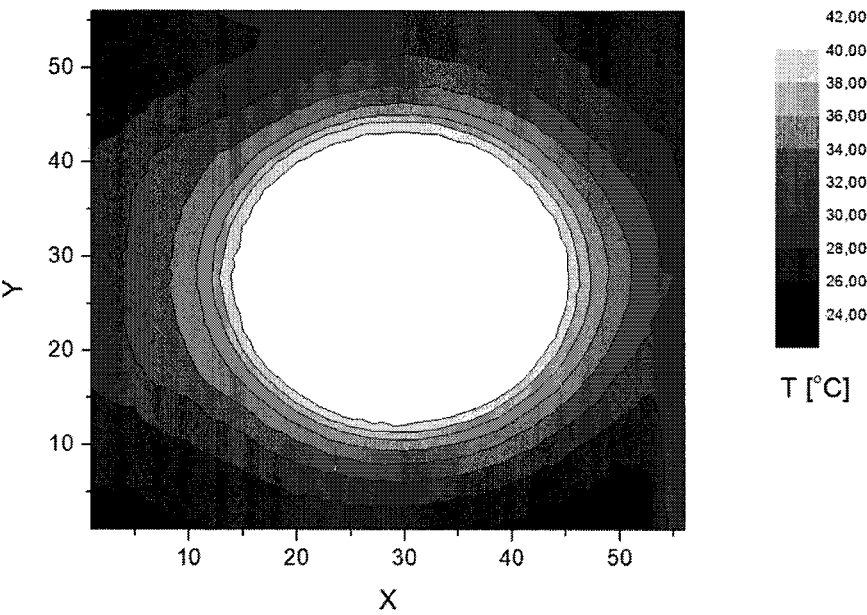
Figure 9A:
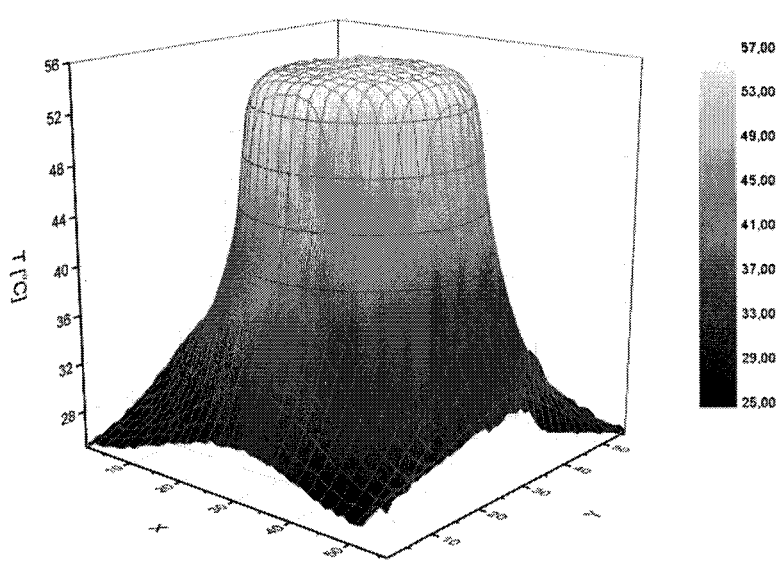
Figure 9B:
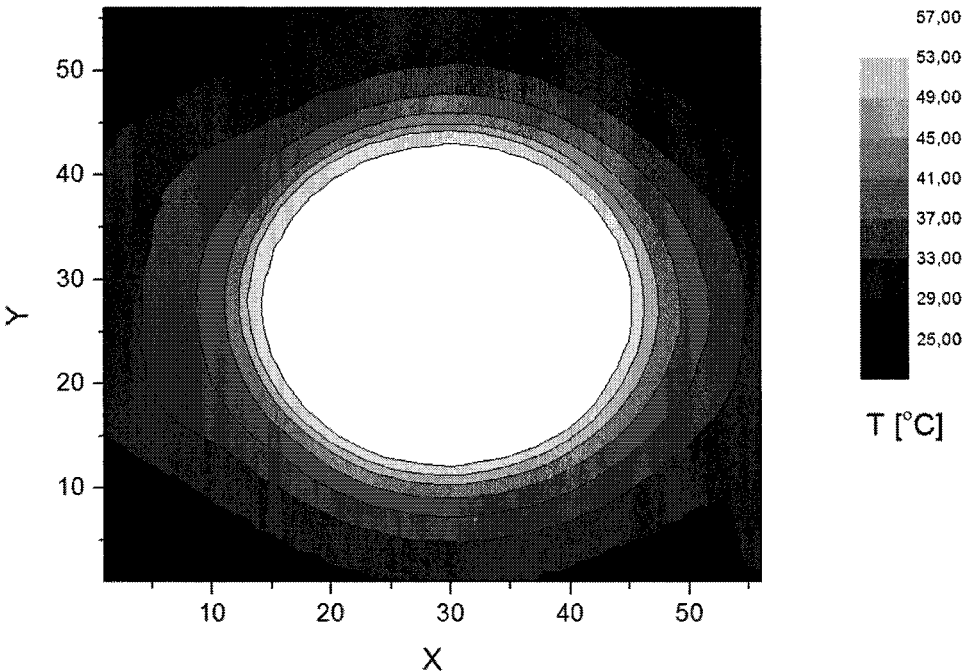
Figure 10A:
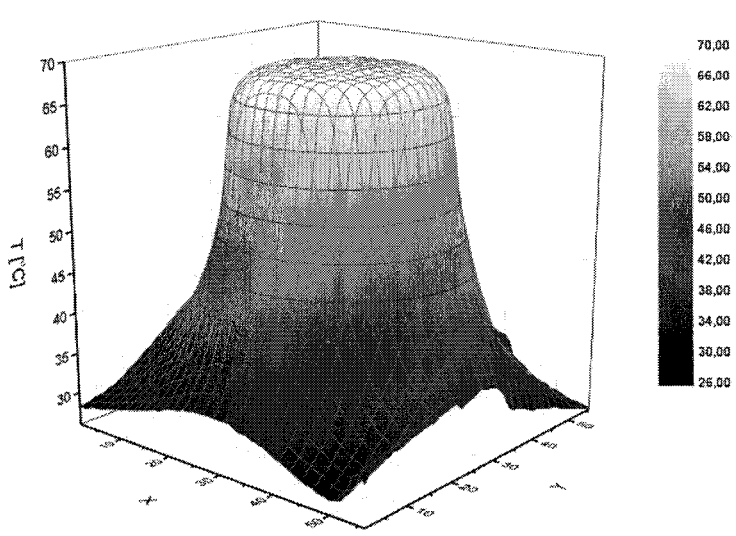
Figure 10B:
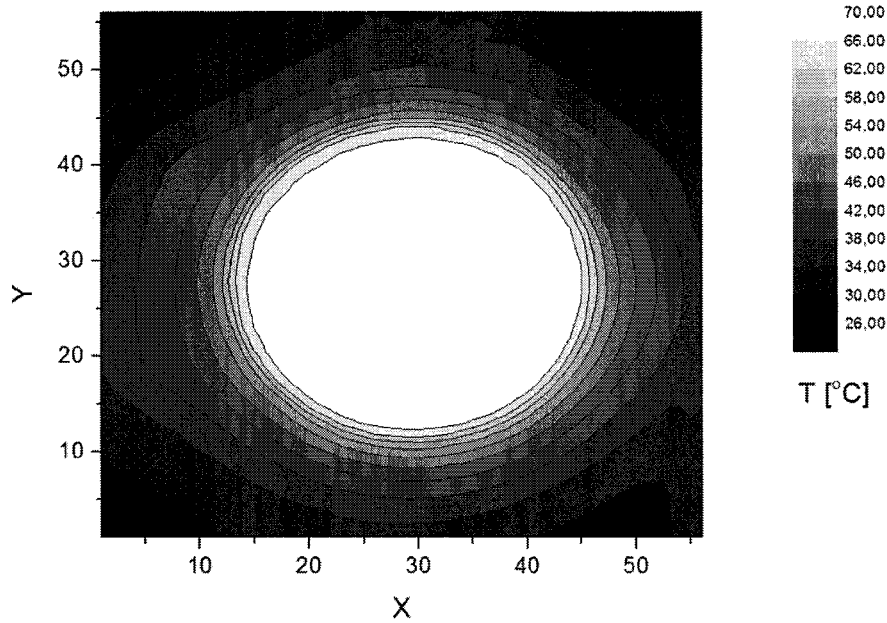
Figure 11A:
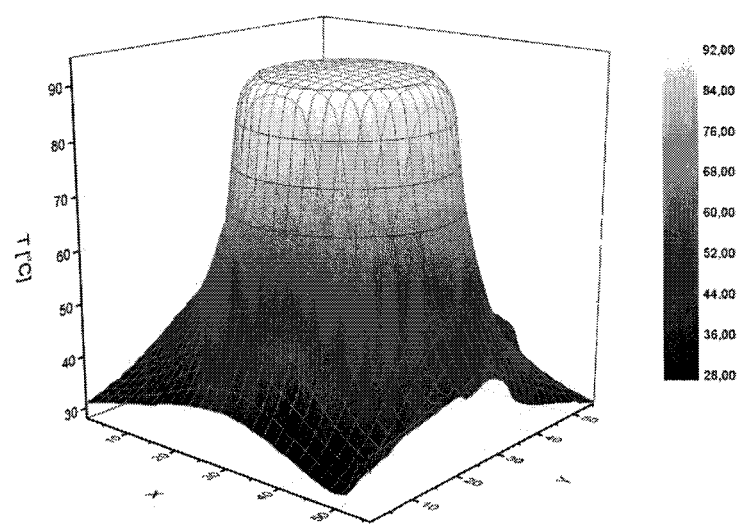
Figure 11B:
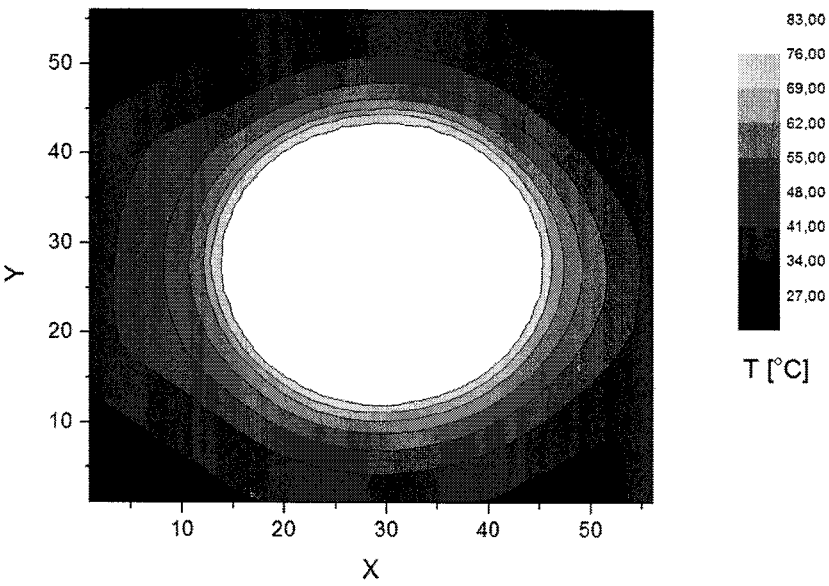
Figure 12A:
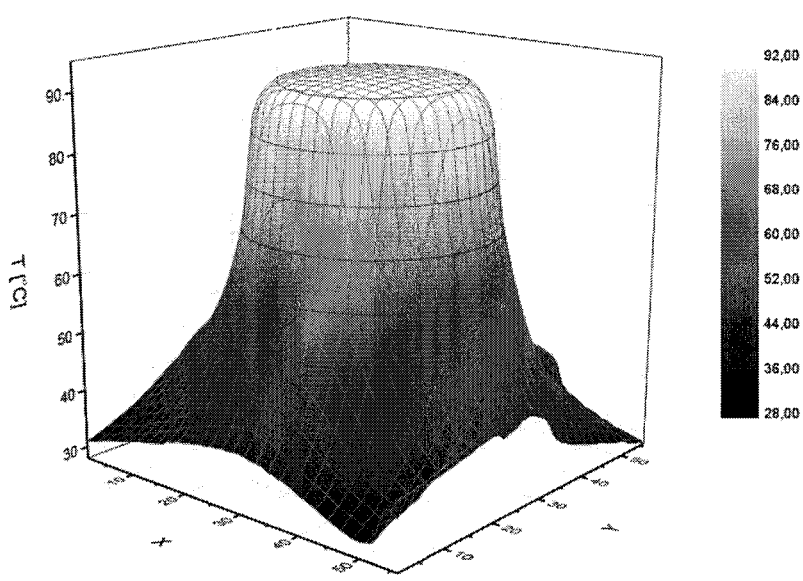
Figure 12B:
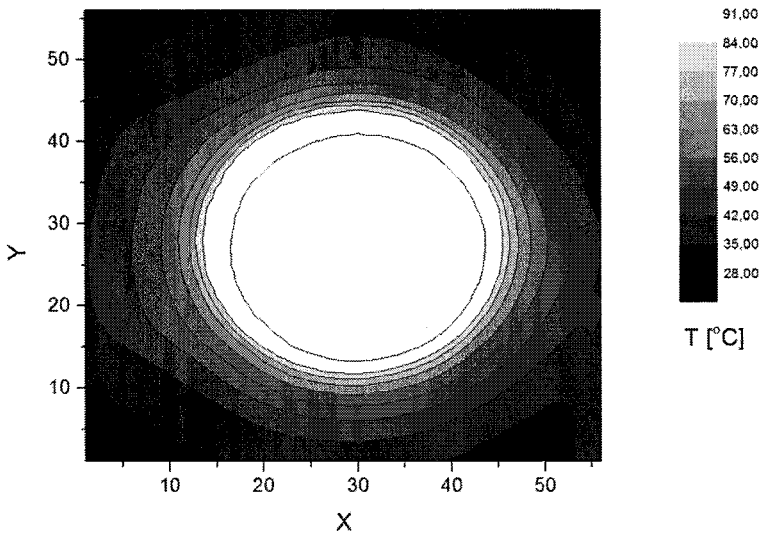
Figure 13A:
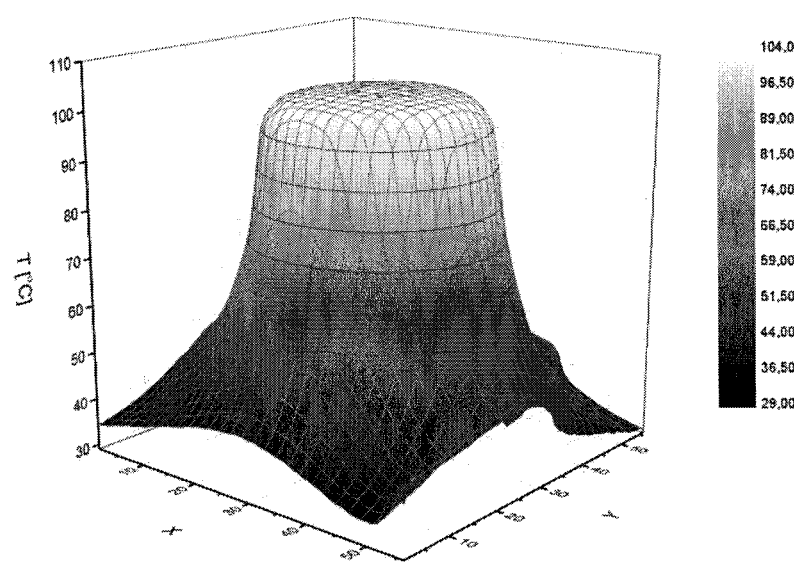
Figure 13B:
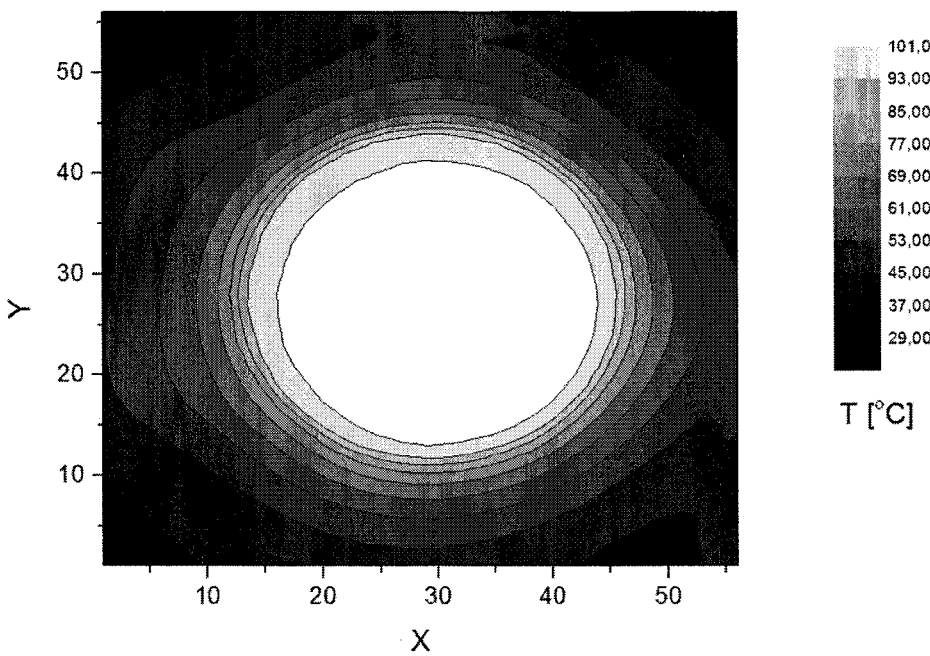
Figure 14A:
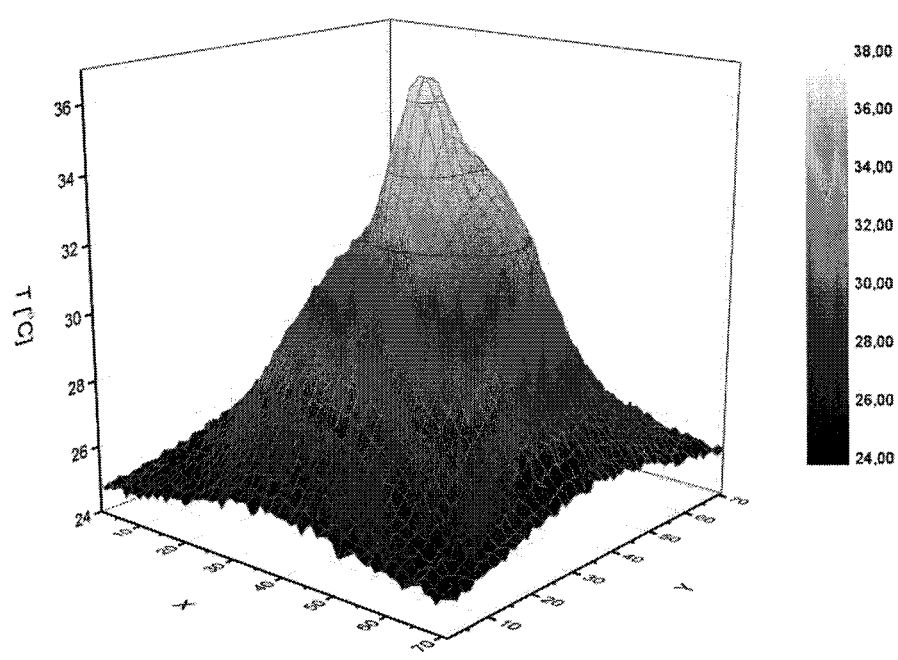
Figure 14B:
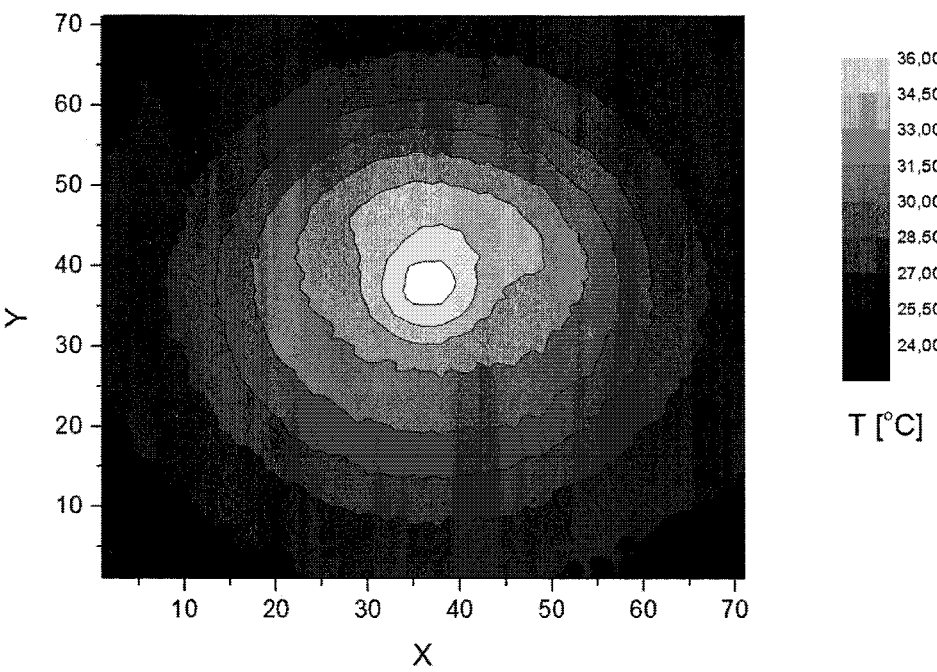
Figure 15A:
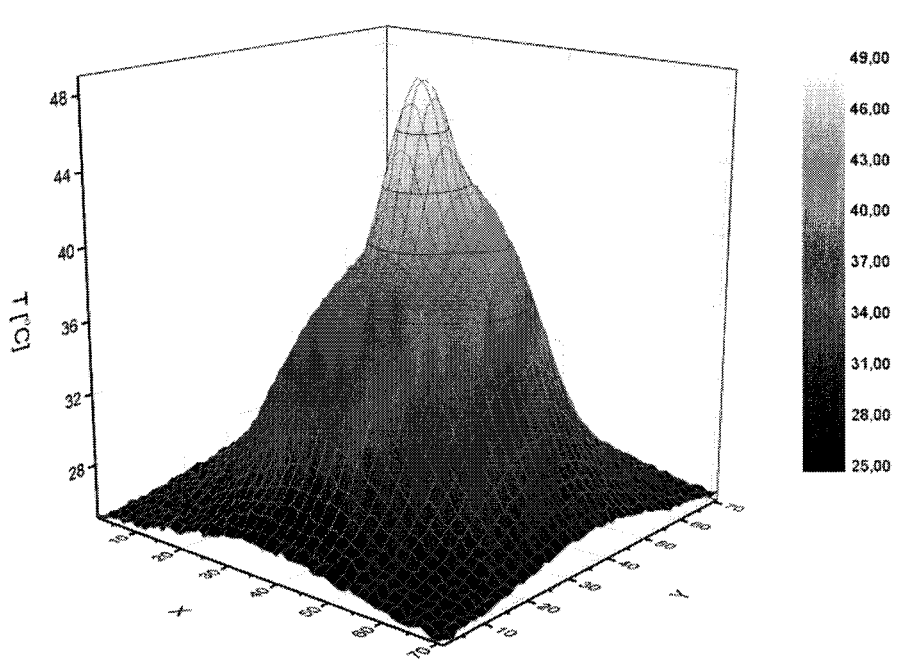
Figure 15B:
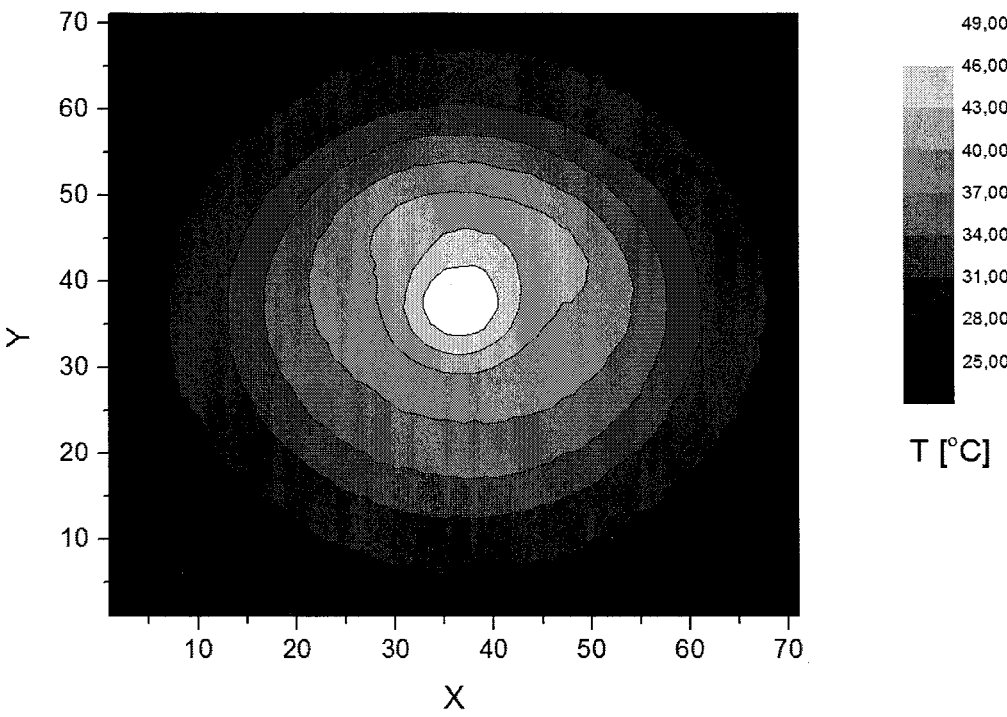
Figure 16A:
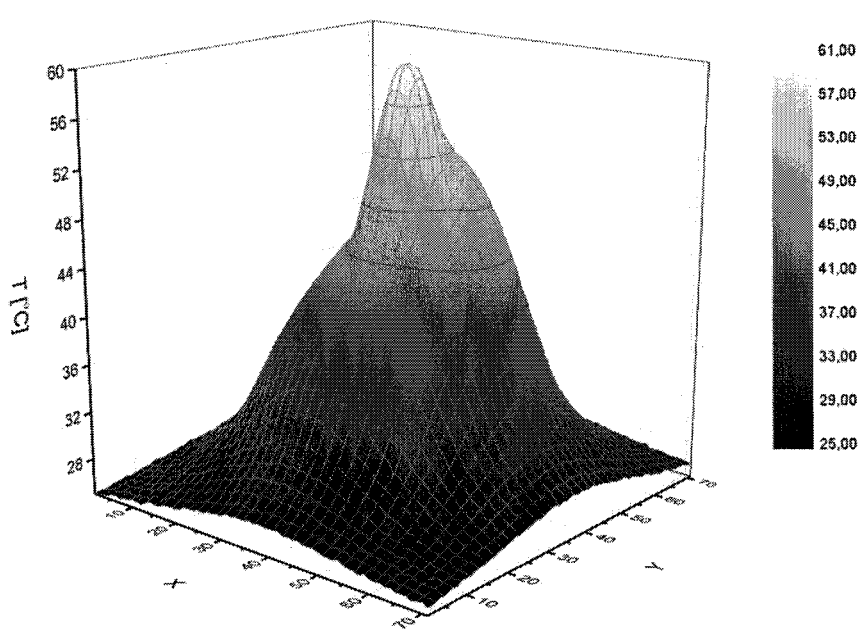
Figure 16B:
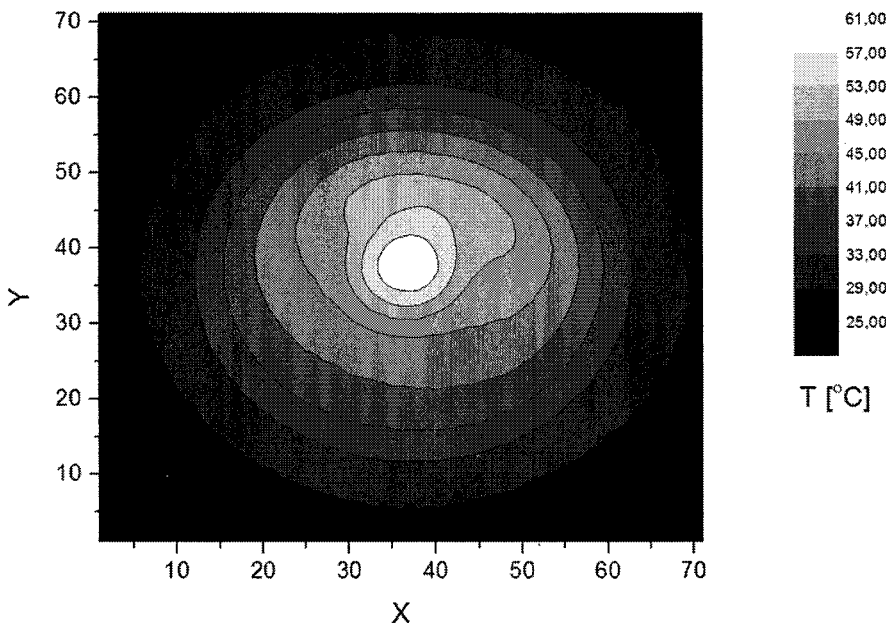
Figure 17A:
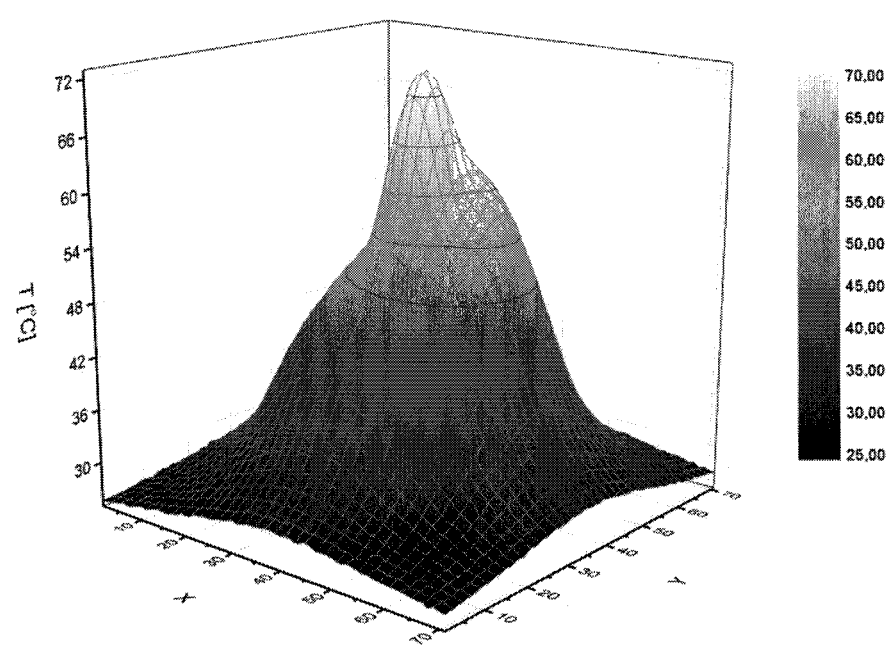
Figure 17B:
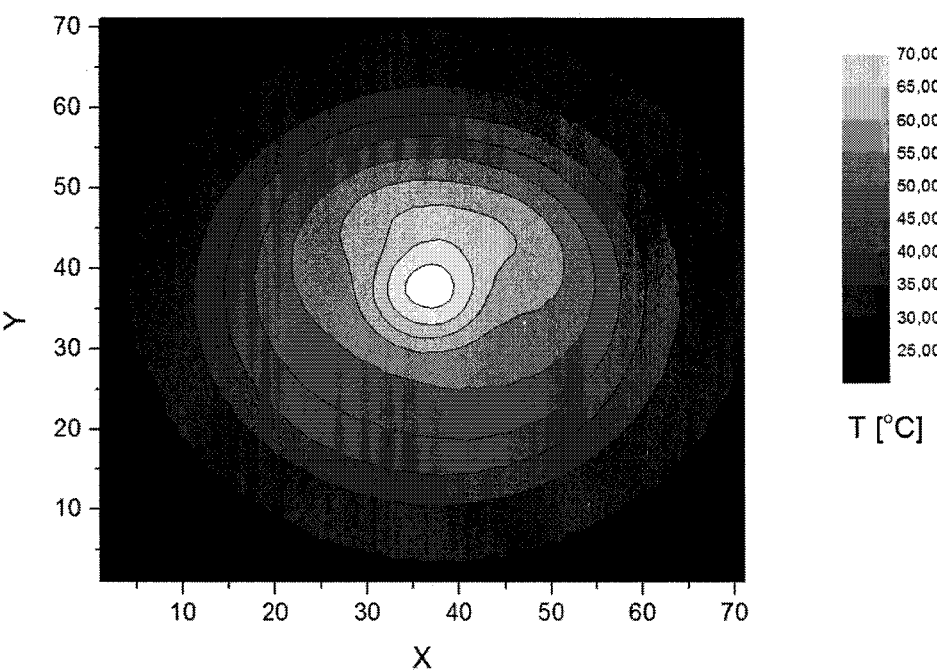
Figure 18A:
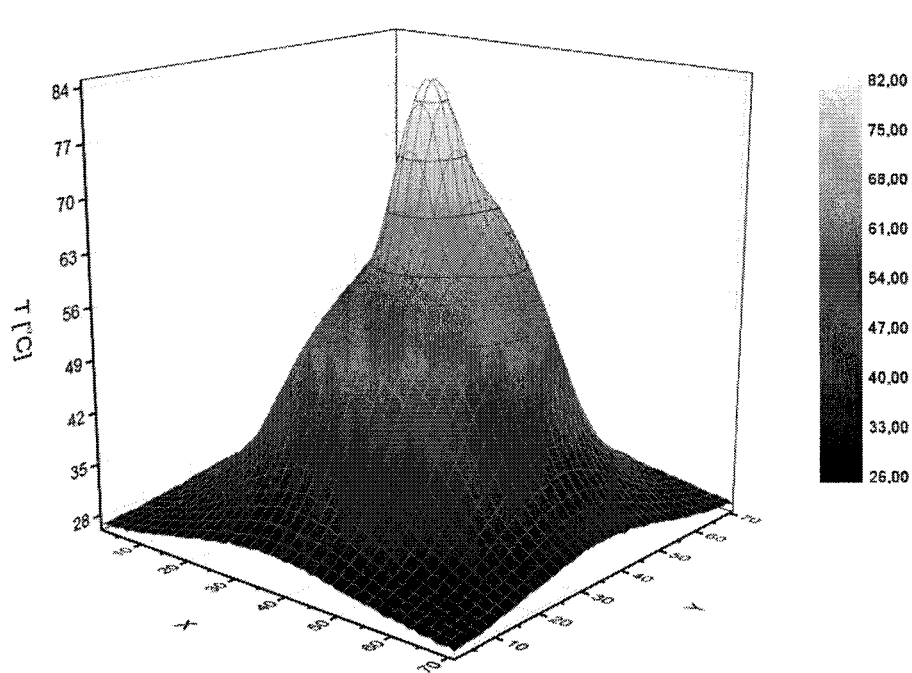
Figure 18B:
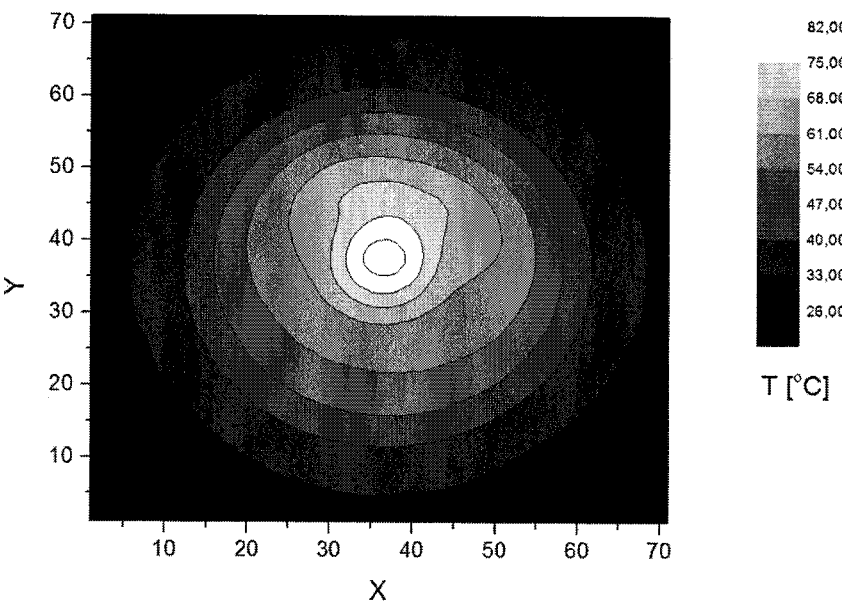
Figure 19A:
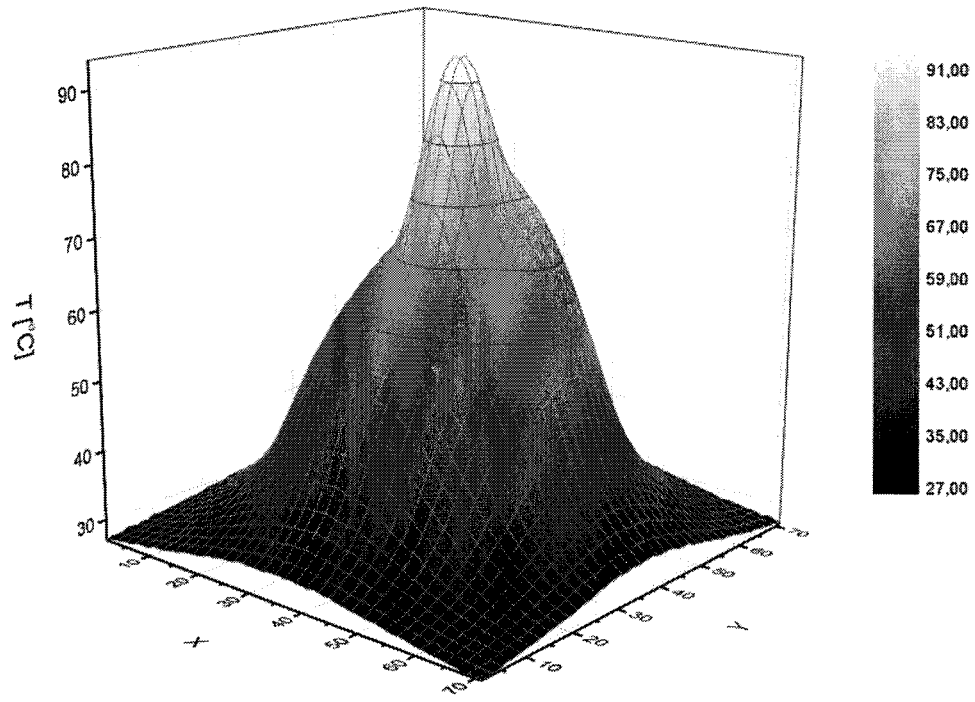
Figure 19B:
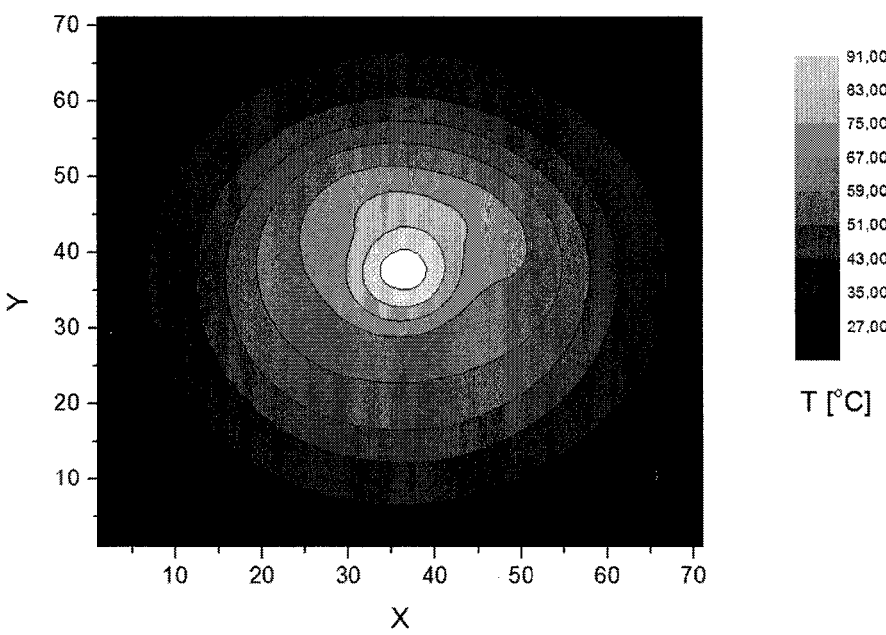
Figure 20A:
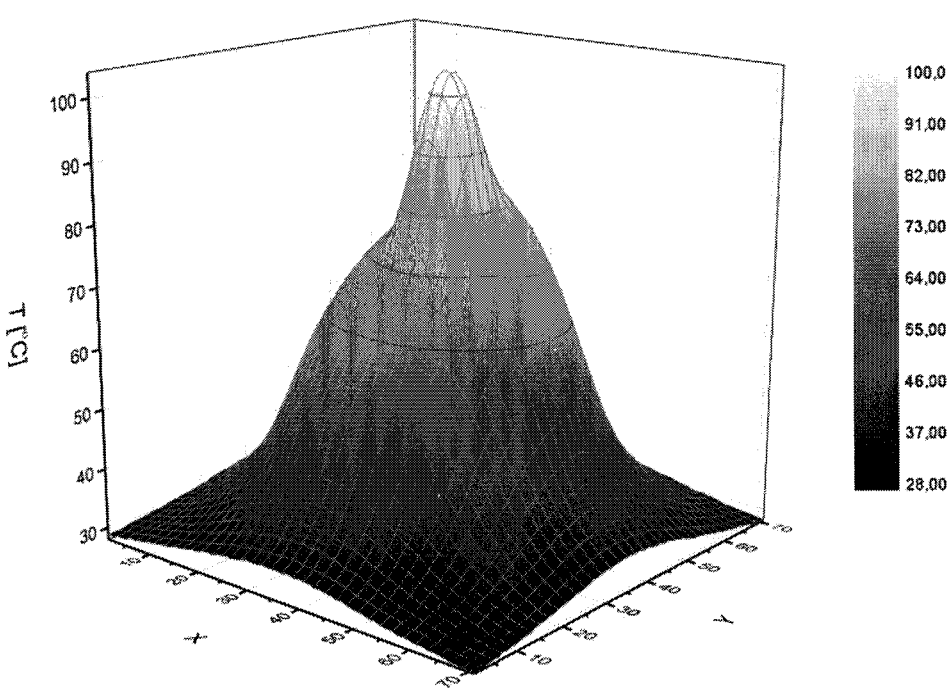
Figure 20B:
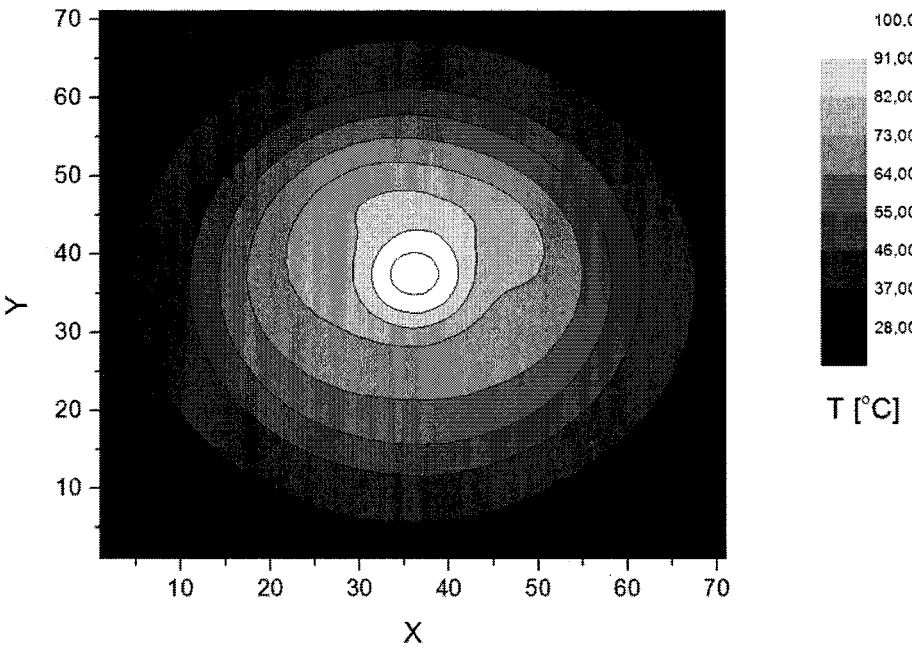
Figure 21:
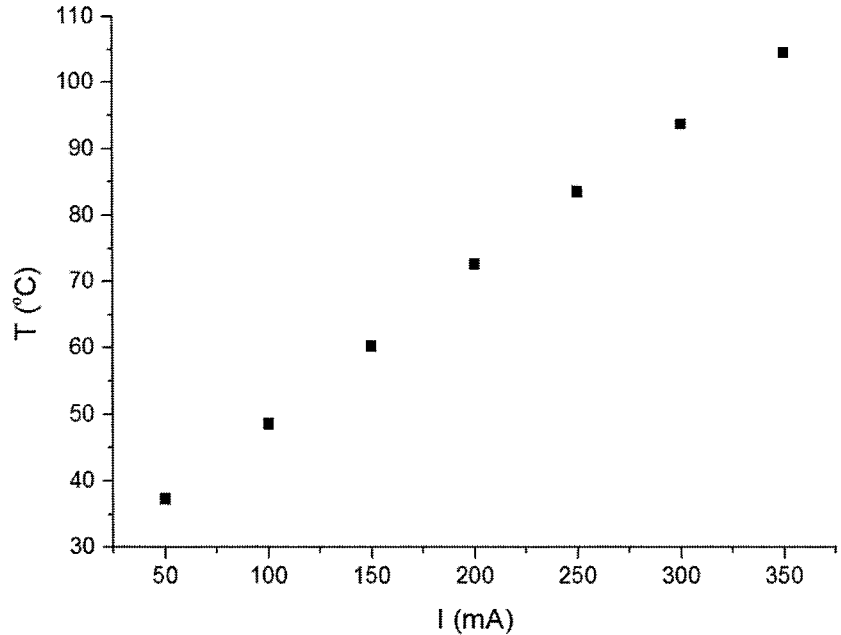
Figure 22:
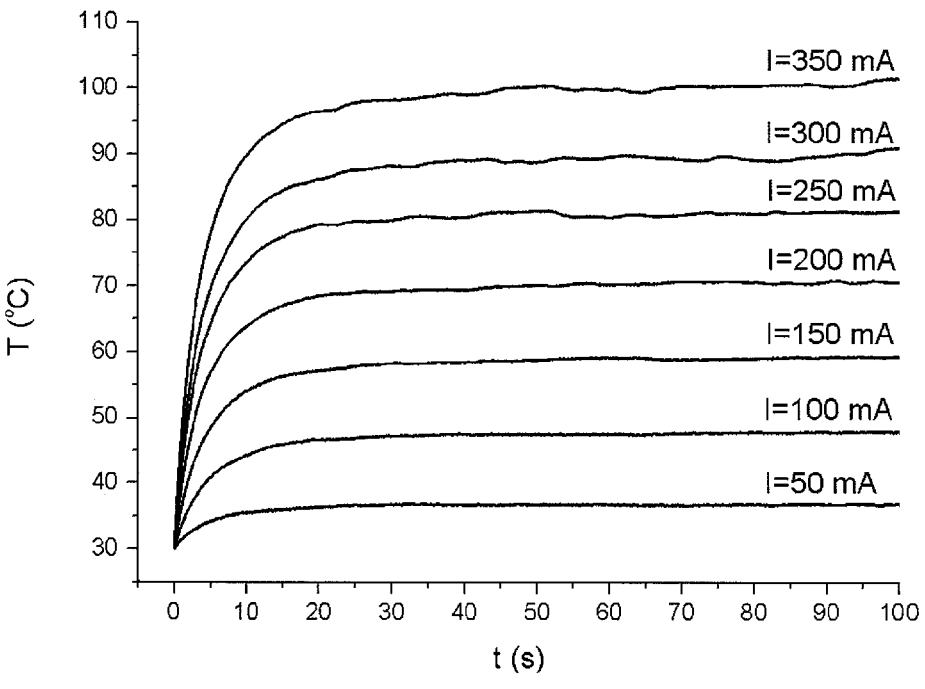
Figure 23:
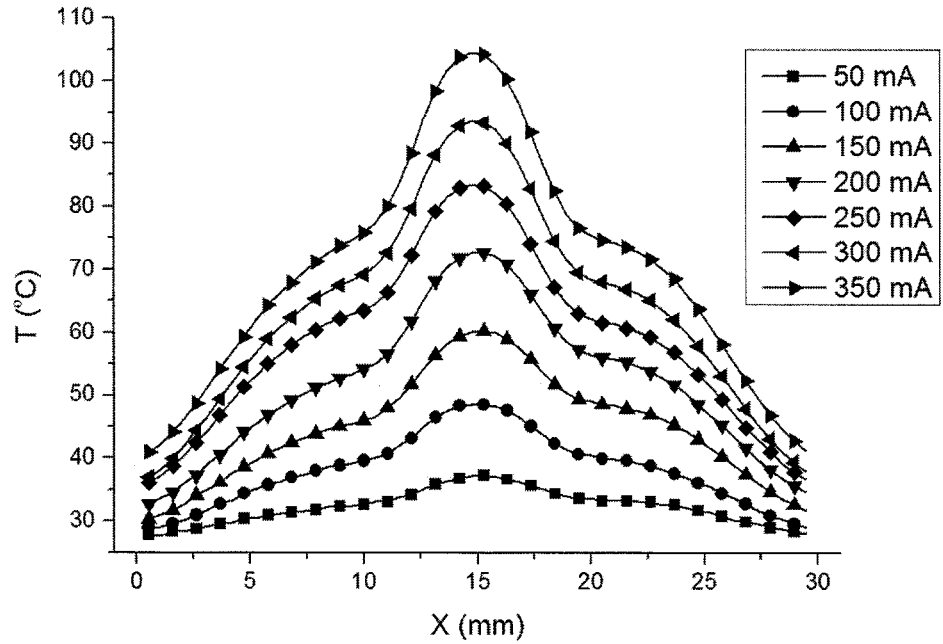
Figure 25:
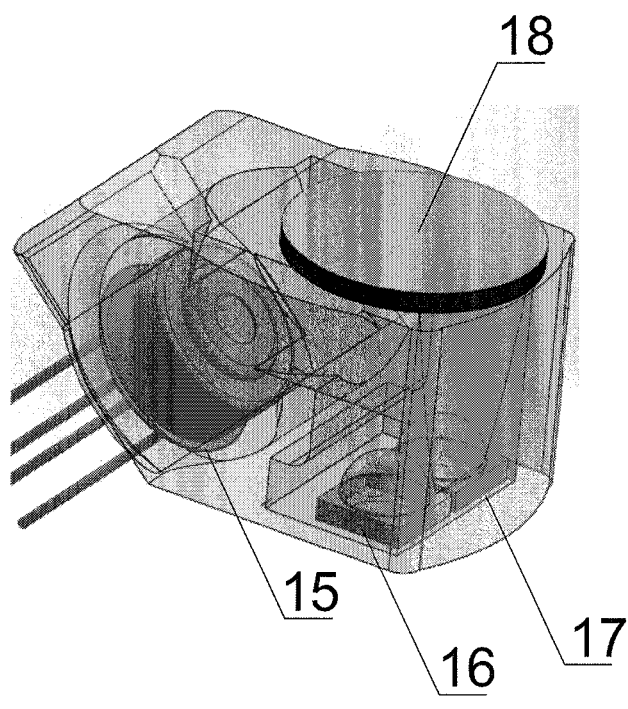
Figure 26:
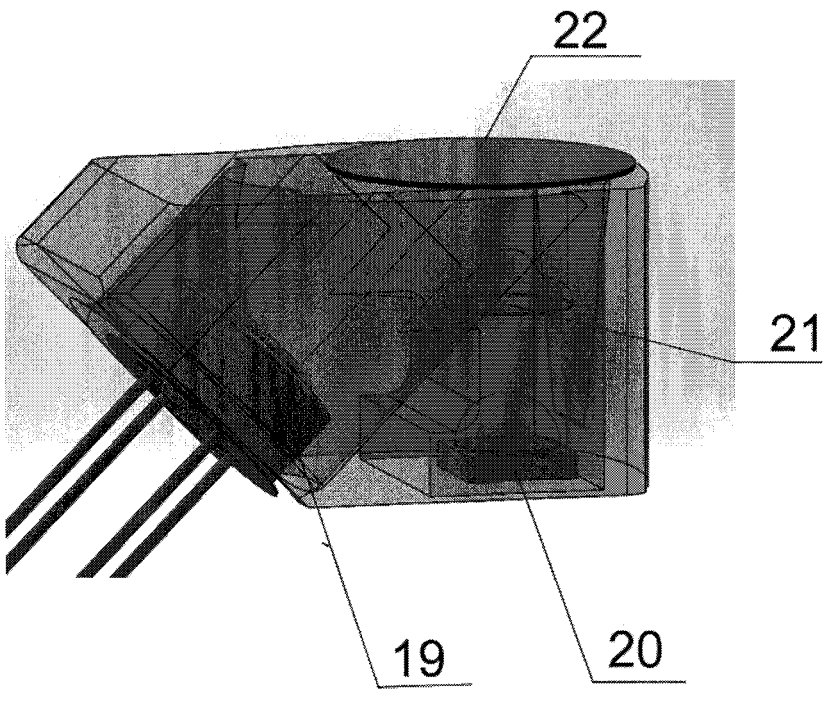

Embodiments of the inventions are presented in the drawing, wherein FIG. 1 presents a method for controlling the temperature of matter at any point or volume of space, FIG. 2 the use of superposition of various sources of radiant energy for the realisation of a temperature profile, FIG. 3 shaping the profile of a temperature field by means of an amplitude of energy sources, FIG. 4 the use of lenses to shape the field of temperatures, FIG. 5 the dependence of temperature in a transverse cross-section of the plane, FIG. 6 temperature as a function of current for its various values, FIG. 7 the dependence of the value of temperature on the current supplying the heat source, FIG. 8A and FIG. 8B a temperature profile for a current of 100 mA in a three-dimensional projection and its two-dimensional map, FIG. 9A and FIG. 9B a temperature profile for a current of 200 mA in a three-dimensional projection and its two-dimensional map, FIG. 10A and FIG. 10B a temperature profile for a current of 300 mA in a three-dimensional projection and its two-dimensional map, FIG. 11A and FIG. 11B a temperature profile for a current of 400 mA in a three-dimensional projection and its two-dimensional map, FIGS. 12A and 12B a temperature profile for a current of 500 mA in a three-dimensional projection and its two-dimensional map, FIGS. 13A and 13B a temperature profile for a current of 600 mA in a three-dimensional projection and its two-dimensional map, 14A and FIG. 14B a temperature profile for a current of 50 mA in a three-dimensional projection and its two-dimensional map for a system with a lens, FIG. 15A and FIG. 15B a temperature profile for a current of 100 mA in a three-dimensional projection and its two-dimensional map for a system with a lens, FIG. 16A and FIG. 16B a temperature profile for a current of 150 mA in a three-dimensional projection and its two-dimensional map for a system with a lens, FIG. 17A and FIG. 17B a temperature profile for a current of 200 mA in a three-dimensional projection and its two-dimensional map for a system with a lens, FIGS. 18A and 18B a temperature profile for a current of 250 mA in a three-dimensional projection and its two-dimensional map for a system with a lens, FIGS. 19A and 19B a temperature profile for a current of 300 mA in a three-dimensional projection and its two-dimensional map for a system with a lens, FIGS. 20A and 20B a temperature profile for a current of 350 mA in a three-dimensional projection and its two-dimensional map for a system with a lens, FIG. 21 the dependence of the value of temperature on the current supplying the heat source for a system with a lens, FIG. 22 temperature as a function of current for its various values for a system with a lens, FIG. 23 the dependence of temperature in a transverse cross-section of the plane for a system with a lens, fig. the comparison of a temperature profile for a system with a lens (■) and without a lens (▲), FIG. 25 a measurement system without a lens, wherein: 15—an MLX90614 detector, 16 and 17 LZ1-00DB05 diodes (maximum working current 1200 mA), 18—a plane irradiated with electromagnetic radiation (a plate made of copper and covered with copper oxide), FIG. 26 FIG. 25 a measurement system without a lens, wherein: 19—an MLX90614 detector, 20 a UV diode, 21 a lens, 22 a plane irradiated with electromagnetic radiation (a polymer plate).

EXAMPLE 1

FIG. 1. Presents a method for controlling temperature by means of a specialised controller (3) with a microprocessor, at a volume point (with coordinates of $\Delta x$, $\Delta y$, $\Delta z$), wherein the source of radiation (2) may be a laser, a LED diode or a piezoceramic transducer. A detector (1) according to the invention may be a pyroelectric or thermocouple sensor, absorbing radiation in the infrared range where the maximum of thermal radiation is placed.

EXAMPLE 2

FIG. 2. presents the use of a system of sources for shaping and controlling volumetric and planar temperature fields in spaces and on material surfaces as a function of time by using the superposition of various sources of radiant energy (4, 5, 6).

EXAMPLE 3

Another embodiment of the invention, presented in FIGS. 3A and 3B, presents a method for generating a field of temperatures by means of controlling the intensity of the individual sources of radiant energy (7, 8, 9) and by adjusting the number of sources. FIG. 3A presents a situation when one of the sources of electromagnetic waves radiates with a higher amplitude, while FIG. 3B—when the amplitude of radiation for one of the sources of electromagnetic waves is being reduced (10, 11, 12).

EXAMPLE 4

Yet another embodiment of the invention enables the use of lenses (14) in order to multiply the effective source of radiant energy (13). By using various kinds of lenses and adjusting the number of radiant energy sources, it is possible to practically form any temperature profile in a volume or on a surface and control it as a function of time (FIG. 4).

EXAMPLE 5

FIG. 5 presents the value of temperature measured for many points in a transverse cross-section of an irradiated plane as a function of current applied to the source of electromagnetic waves. On the other hand, FIG. 6 presents changes in the measured temperature at a point as a function of time depending on the current applied to the source of electromagnetic waves. FIG. 7 depicts a linear increase in the measured temperature as a function of current flowing through the source of electromagnetic waves.

EXAMPLE 6

Figures from 8A to 13B present the shapes of temperature profiles on a planar surface for various values of current powering the sources of electromagnetic waves, created as a result of using the method according to the present invention.

EXAMPLE 7

Figures from 14A to 20B present the shapes of temperature profiles on a planar surface for various values of current powering the sources of electromagnetic waves, created as a result of using the method according to the present invention in a system with a lens.

EXAMPLE 8

Figure 24:
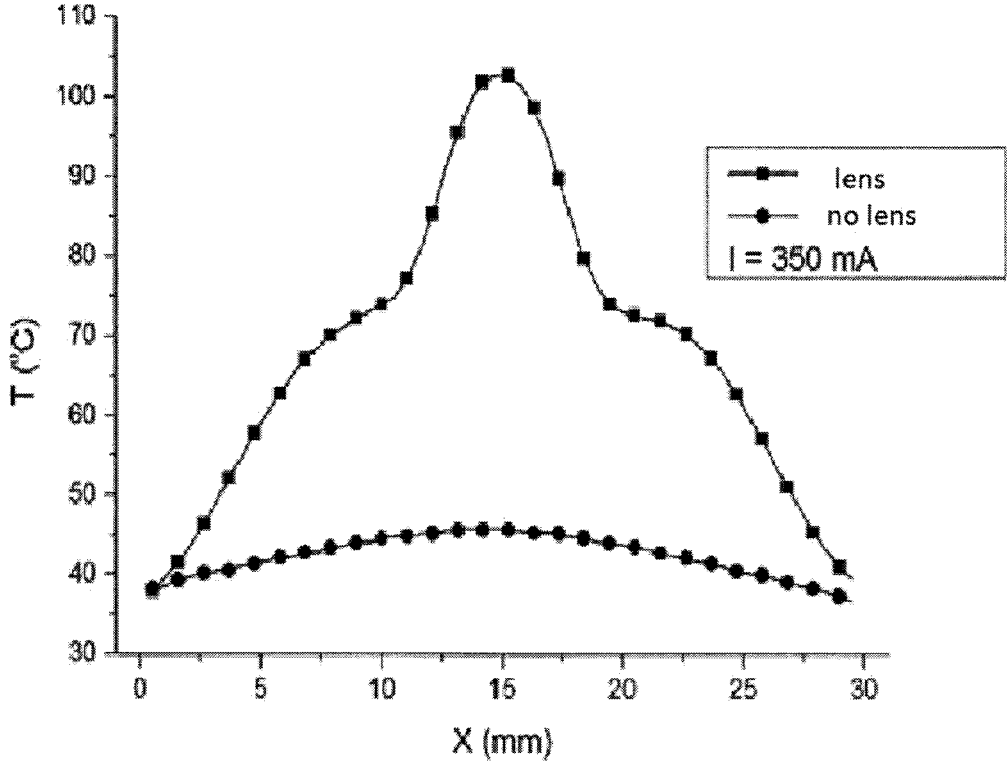

FIG. 21 depicts a linear increase in the measured temperature as a function of current flowing through the source of electromagnetic waves in a system with a lens. On the other hand, FIG. 22 presents changes in the measured temperature at a point as a function of time depending on the current applied to the source of electromagnetic waves in a system with a lens. FIG. 23 presents the value of temperature measured for many points in a transverse cross-section of an irradiated plane as a function of current applied to the source of electromagnetic waves upon placing a lens shaping the profile of the wavefront between the source and the irradiated surface. FIG. 24 presents a comparison of a wavefront modified by means of a lens(■) with a wavefront without a lens(▲).

EXAMPLE 9

FIG. 25 presents a measurement system comprising an MLX90614 detector (15), sources of electromagnetic radiation—LZ1-00DB05 diodes, a maximum working current of 1200 mA (16, 17) and a plane irradiated with electromagnetic radiation (18, a plate made of copper and covered with copper oxide) for shaping planar wavefronts.

EXAMPLE 10

FIG. 26 presents a measurement system comprising an MLX90614 detector (19), a source of electromagnetic radiation—a UV diode (20), a lens (21) and a plane irradiated with electromagnetic radiation (a planar plate made of polymer, 22) for shaping the wavefronts by means of a lens.

The invention claimed is:

1. A set for controlling the temperature of a target, the set comprising:

a source of radiation configured to output radiation towards the target to heat the target;

a thermal radiation detector configured to detect thermal radiation emitted from the target;

a controller connected to the source of radiation and to the thermal radiation detector, so that the source of radiation, the thermal radiation detector and the controller are arranged in a feedback loop, wherein the controller is configured to operate the source of radiation in accordance with thermal radiation detected by the thermal radiation detector; and a wavefront modifier configured to modify a profile of a wavefront of the radiation output by the source of radiation.

2. The set of claim 1, wherein the source of radiation includes a laser, a diode, a piezoceramic transducer, or an ultrasound generator.

3. The set of claim 1, wherein the thermal radiation detector comprises a pyroelectric detector or a thermocouple detector.

4. The set of claim 1, wherein the source of radiation is configured to output electromagnetic radiation in the ultraviolet range.

5. The set of claim 1, wherein the wavefront modifier includes at least one further source of radiation.

6. The set of claim 5, wherein the further source of radiation is configured to produce radiation that superposes with the radiation produced by the source of radiation.

7. The set of claim 6, wherein the controller is configured to operate the source of radiation and the further source of radiation individually to modify a profile of a wavefront of the superposed radiation.

8. The set of claim 1, wherein the wavefront modifier includes a lens.

9. The set of claim 8, wherein the lens lies in a path between the source of radiation and the target.

10. The set of claim 8, wherein the lens is offset from a path between the source of radiation and the target.

11. The set of claim 8, wherein the wavefront modifier includes multiple lenses.

12. A method for controlling the temperature of a target with the set of claim 1, the method comprising:

directing heating radiation towards the target to heat the target;

detecting thermal radiation emitted from the target;

regulating the heating radiation in accordance with the detected thermal radiation; and shaping the profile of a wavefront of the heating radiation by:

superposing additional heating radiation with the heating radiation; or directing the heating radiation through a lens or a system of lenses.

13. The set of claim 1, wherein the source of radiation is a heater.

* * * * *